US012356468B2

(12) United States Patent
Lin et al.

(10) Patent No.: US 12,356,468 B2
(45) Date of Patent: Jul. 8, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventors: Xue Lin, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 349 days.

(21) Appl. No.: 17/707,864

(22) Filed: Mar. 29, 2022

(65) Prior Publication Data
US 2022/0225433 A1    Jul. 14, 2022

Related U.S. Application Data

(63) Continuation of application No. PCT/CN2019/126733, filed on Dec. 19, 2019.

(51) Int. Cl.
*H04W 74/0833* (2024.01)
*H04L 1/00* (2006.01)
(Continued)

(52) U.S. Cl.
CPC ....... *H04W 74/0841* (2013.01); *H04L 1/0007* (2013.01); *H04W 72/044* (2013.01);
(Continued)

(58) Field of Classification Search
CPC ......... H04W 74/0841; H04W 74/0866; H04W 74/008; H04W 74/0833; H04W 72/044; H04W 72/0453; H04L 1/0007
See application file for complete search history.

(56) References Cited

U.S. PATENT DOCUMENTS 11,576,212 B2 * 2/2023 Agiwal ............ H04W 72/0453
2018/0279375 A1 9/2018 Jeon et al.
(Continued)

FOREIGN PATENT DOCUMENTS

CN    106899964 A    6/2017
CN    108271214 A    7/2018

OTHER PUBLICATIONS

International Search Report issued in corresponding International Application No. PCT/CN2019/126733, mailed Sep. 24, 2020, 27 pages.
(Continued)

*Primary Examiner* — Redentor Pasia
(74) *Attorney, Agent, or Firm* — BAYES PLLC

(57) ABSTRACT

Embodiments of the present application provide a wireless communication method, a terminal device, and a network device. In the case that both a two-step random access resource and a four-step random access resource are configured on an uplink BWP, a terminal device first selects to perform two-step random access, and the terminal device can determine whether to allow switching from two-step random access to four-step random access, and thus, the flexibility of random access is achieved. The wireless communication method includes in the case that a two-step random access resource and a four-step random access resource are configured on an uplink BWP, a terminal device determines whether to allow switching from two-step random access to four-step random access.

20 Claims, 5 Drawing Sheets

(51) Int. Cl.
*H04W 72/044* (2023.01)
*H04W 74/08* (2024.01)
*H04W 74/0836* (2024.01)

(52) U.S. Cl.
CPC ... *H04W 74/0833* (2013.01); *H04W 74/0836* (2024.01); *H04W 74/0866* (2013.01)

(56) References Cited

U.S. PATENT DOCUMENTS

| | | | |
|---|---|---|---|
| 2020/0236717 A1* | 7/2020 | Sun | H04W 74/0833 |
| 2020/0252967 A1* | 8/2020 | Ozturk | H04W 56/001 |
| 2020/0252973 A1* | 8/2020 | Zhang | H04W 76/10 |
| 2020/0404711 A1* | 12/2020 | Zhao | H04W 80/02 |
| 2021/0385881 A1* | 12/2021 | Shi | H04L 1/1614 |
| 2022/0053575 A1* | 2/2022 | He | H04W 74/0836 |
| 2022/0132589 A1* | 4/2022 | Bao | H04W 74/0833 |
| 2022/0167401 A1* | 5/2022 | Zheng | H04W 74/04 |
| 2022/0256620 A1* | 8/2022 | Lu | H04W 72/044 |
| 2022/0264638 A1* | 8/2022 | Qiu | H04W 74/085 |
| 2022/0312484 A1* | 9/2022 | Murray | H04W 74/0833 |
| 2022/0377812 A1* | 11/2022 | Jung | H04L 5/0053 |
| 2023/0180305 A1* | 6/2023 | Kusashima | H04W 74/0833 370/329 |

OTHER PUBLICATIONS

Written Opinion of the International Searching Authority issued in corresponding International Application No. PCT/CN2019/126733, mailed Sep. 24, 2020, 6 pages.

"Legacy CFRA and Selection between 2 step and 4 step RA", Agenda item: 6.13.2, Source: Samsung, 3GPP TSG-RAN2 108 R2-1914432, Reno, USA, Nov. 18-22, 2019, 3 pages.

"Remaining issue on 2-step RACH fall back procedure", Agenda item: 6.13.2, Source: Qualcomm Incorporated, 3GPP TSG-RAN WG2 Meeting #108 R2-1916065, Reno, Nevada, US, Nov. 18-22, 2019, 2 pages.

"Further Discussions on Fallback Procedure for 2-step RACH", Agenda Item: 6.13.2, Source: Huawei, HiSilicon, 3GPP TSG-RAN WG2 Meeting#108 R2-1916018, Reno, USA, Nov. 18-22, 2019, 2 pages.

"RA type switch and fallback in 2-step RA", Agenda Item: 6.13.2, Source: Ericsson, 3GPP TSG-RAN WG2 #108 R2-1915602, Reno, Nevada, USA, Nov. 18-22, 2019, 3 pages.

Extended European Search Report issued in corresponding European application No. 19956701.7, mailed Aug. 4, 2022.

Oppo, "Remaining issues on supporting 2-step RACH configuration on a UL BWP without 4-step RACH resources", R2-1912084, 3GPP TSG-RAN WG2 Meeting #107bis Chongqing, China, Oct. 14-Oct. 18, 2019.

Oppo, "Remaining issues on supporting 2-step RACH only configuration", R2-1914390, 3GPP TSG-RAN WG2 Meeting #108 Reno, USA, Nov. 18-Nov. 22, 2019.

Communication pursuant to Article 94(3) EPC issued in corresponding European Application No. 19956701.7, dated Sep. 20, 2024, 5 pages.

\* cited by examiner

WIRELESS COMMUNICATION METHOD, TERMINAL DEVICE, AND NETWORK DEVICE

CROSS-REFERENCE TO RELATED APPLICATIONS

This application is a continuation of International Application No. PCT/CN2019/126733, filed Dec. 19, 2019, the contents of which are incorporated herein by reference in its entirety.

TECHNICAL FIELD

The embodiments of the present application relate to the field of communication, and more particularly, to a wireless communication method, a terminal device, and a network device.

BACKGROUND

Two-step random access can be supported in the New Radio (NR) system. In the two-step random access, the first message (Message 1, Msg 1) and the third message (Msg 3) in the four-step random access may be sent as the first message (Message A, Msg A) in the two-step random access, and the second message (Msg 2) and the fourth message (Msg 4) in the four-step random access are sent as the second message (Message B, Msg B) in the two-step random access. In some scenarios, the two-step random access resources and the four-step random access resources may be configured on the uplink bandwidth part (Band Width Part, BWP) at the same time. How the terminal device selects the random access manner is an urgent problem to be solved.

SUMMARY

Embodiments of the present application provide a wireless communication method, a terminal device, and a network device. In the case where the resource of the two-step random access and the resource of the four-step random access are configured on the uplink BWP, the terminal device selects to perform the two-step random access, and the terminal device may determine whether to allow switching from the two-step random access to the four-step random access, whereby realizing the flexibility of random access.

In a first aspect, there is provided a wireless communication method, the method including:

in a case where a resource of a two-step random access and a resource of a four-step random access are configured on an uplink BWP, determining, by a terminal device, whether to allow switching from the two-step random access to the four-step random access.

In a second aspect, there is provided a wireless communication method, the method including:

in a case where a resource of a two-step random access and a resource of a four-step random access are configured on an uplink BWP, sending, by a network device, first configuration information for configuring a parameter of the two-step random access and second configuration information for configuring a parameter of the four-step random access to a terminal device, where the first configuration information and the second configuration information are used by the terminal device to determine whether to allow switching from the two-step random access to the four-step random access.

In a third aspect, there is provided a terminal device for executing the method in the above-mentioned first aspect or each implementation manner thereof.

Specifically, the terminal device includes a functional module for executing the method in the above-mentioned first aspect or each implementation manner thereof.

In a fourth aspect, there is provided a network device for executing the method in the second aspect or each implementation manner thereof.

Specifically, the network device includes a functional module for executing the method in the second aspect or each implementation manner thereof.

In a fifth aspect, there is provided a terminal device, including a processor and a memory. The memory is used for storing a computer program, and the processor is used for calling and running the computer program stored in the memory to execute the method in the above-mentioned first aspect or each implementation manner thereof.

In a sixth aspect, there is provided a network device, including a processor and a memory. The memory is used for storing a computer program, and the processor is used for calling and running the computer program stored in the memory to execute the method in the above-mentioned second aspect or each implementation manner thereof.

In a seventh aspect, there is provided an apparatus for implementing the method in any one of the above-mentioned first aspect to the second aspect or each implementation manner thereof.

Specifically, the apparatus includes: a processor for calling and running a computer program from a memory, so that a device installed with the apparatus executes the method in any one of the above-mentioned first aspect to the second aspect or each implementation manner thereof.

In an eighth aspect, there is provided a computer-readable storage medium for storing a computer program, and the computer program causes a computer to execute the method in any one of the above-mentioned first aspect to the second aspect or each implementation manner thereof.

In a ninth aspect, there is provided a computer program product, including computer program instructions, and the computer program instructions cause a computer to execute the method in any one of the above-mentioned first aspect to the second aspect or each implementation manner thereof.

In a tenth aspect, there is provided a computer program which, when run on a computer, causes a computer to perform the method in any one of the above-mentioned first aspect to the second aspect or each implementation manner thereof.

Through the above technical solutions, in the case that the resource of the two-step random access and the resource of the four-step random access are configured on the uplink BWP at the same time, the terminal device can determine whether to allow switching from the two-step random access to the four-step random access, whereby realizing the flexibility of random access.

DETAILED DESCRIPTION

The technical solutions in the embodiments of the present application will be described below in conjunction with the drawings in the embodiments of the present application. Obviously, the described embodiments are a part of the embodiments of the present application, rather than all of the embodiments.

Based on the embodiments in the present application, all other embodiments obtained by those of ordinary skill in the art without creative work shall fall within the protection scope of the present application.

The embodiments of the present application may be applied to various communication systems, such as: a Global System of Mobile communication (GSM) system, a Code Division Multiple Access (CDMA) system, a Wideband Code Division Multiple Access (WCDMA) system, General Packet Radio Service (GPRS), a Long Term Evolution (LTE) system, an Advanced long term evolution (LTE-A) system, a New Radio (NR) system, an evolution system of NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next-generation communication system or other communication systems, etc.

Generally speaking, conventional communication systems support a limited number of connections and are easy to implement. However, with the development of communication technology, the mobile communication systems will not only support conventional communication, but also support, for example, Device to Device (D2D) communication, Machine to Machine (M2M) communication, Machine Type Communication (MTC), and Vehicle to Vehicle (V2V) communication, etc. The embodiments of the present application may also be applied to these communication systems.

Optionally, the communication system in the embodiments of the present application may be applied to a Carrier Aggregation (CA) scenario, a Dual Connectivity (DC) scenario, or a Standalone (SA) network deployment scenario.

The embodiments of the present application do not limit the applied spectrum. For example, the embodiments of the present application may be applied to a licensed spectrum, and may also be applied to an unlicensed spectrum.

Figure 1:
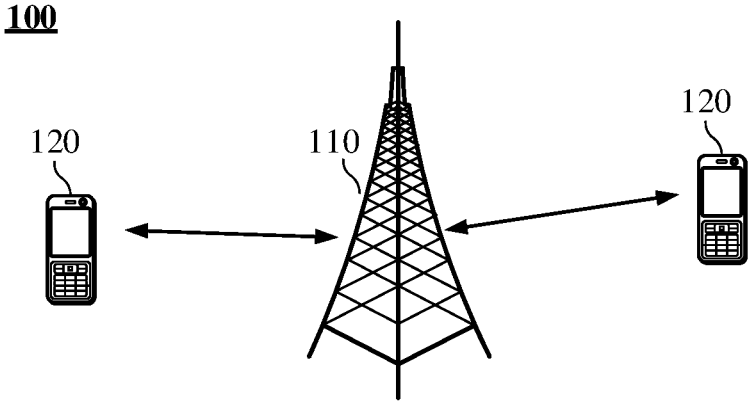
FIG. 1 is a schematic diagram of a communication system architecture provided by an embodiment of the present application.

Exemplarily, a communication system 100 to which the embodiments of the present application are applied is shown in FIG. 1. The communication system 100 may include a network device 110, and the network device 110 may be a device that communicates with a terminal device 120 (or referred to as a communication terminal, a terminal). The network device 110 may provide communication coverage for a particular geographic area, and may communicate with the terminal device(s) located within the coverage area.

FIG. 1 exemplarily shows one network device and two terminal devices. Optionally, the communication system 100 may include a plurality of network devices and the coverage of each network device may include other numbers of the terminal devices, which is not limited by the embodiments of the present application.

Optionally, the communication system 100 may further include other network entities such as a network controller and a mobility management entity, which are not limited in the embodiments of the present application.

It should be understood that, in the embodiments of the present application, a device having a communication function in the network/system may be referred to as a communication device. Taking the communication system 100 shown in FIG. 1 as an example, the communication device may include a network device 110 and a terminal device 120 with a communication function, and the network device 110 and the terminal device 120 may be the specific devices described above, which will not be repeated here. The communication device may also include other devices in the communication system 100, such as other network entities, for example, a network controller, a mobility management entity, etc., which are not limited in the embodiments of the present application.

It should be understood that the terms "system" and "network" are often used interchangeably herein. The term "and/or" in the present disclosure is only an association relationship to describe the associated objects, indicating that there may be three kinds of relationships.

For example, A and/or B may mean the following three cases: A exists alone, A and B exist at the same time, and B exists alone.

In addition, the character "/" in the present disclosure generally indicates that the related objects are in an "or" relationship.

The embodiments of the present application describe various embodiments in conjunction with the terminal device and the network device. The terminal device may also be referred to as User Equipment (UE), an access terminal, a subscriber unit, a subscriber station, a mobile station, a mobile, a remote station, a remote terminal, a mobile device, a user terminal, a terminal, a wireless communication device, a user agent or a user apparatus, etc. The terminal device may be a station (STAION, ST) in the WLAN, and may be a cellular phone, a cordless phone, a Session Initiation Protocol (SIP) phone, a Wireless Local Loop (WLL) station, a Personal Digital Assistant (PDA)

device, a handheld device with wireless communication capabilities, a computing device or other processing devices connected to a wireless modem, an in-vehicle device, a wearable device, and a next-generation communication system, such as the terminal device in NR networks or the terminal device in the future evolved Public Land Mobile Network (PLMN) network, etc.

As an example and not a limitation, in the embodiments of the present application, the terminal device may also be a wearable device. The wearable device may also be called a wearable smart device, which is a general term for devices that may be worn and that are obtained by performing smart design and development on the daily wear using wearable technology, such as glasses, gloves, watches, clothing and shoes. The wearable device is a portable device that is worn directly on the body or integrated into the user's clothing or accessories. The wearable device is not only a hardware device, but also realizes powerful functions through software support, data interaction, and cloud interaction. In a broad sense, the wearable smart device includes: devices that have full function, large-scale, and may realize complete or partial functions without relying on the smart phone, such as smart watches or smart glasses; and devices that only focus on a certain type of application function and needs to be used with other device such as the smart phone, for instance, all kinds of smart bracelets, smart jewelry, etc. for physical sign monitoring.

The network device may be a device used to communicate with the mobile device. The network device may be an Access Point (AP) in WLAN, a base station (Base Transceiver Station, BTS) in GSM or CDMA, or a base station (NodeB, NB) in WCDMA, or may be an evolved base station (Evolutional Node B, eNB or eNodeB) in LTE, or a relay station or an access point, or a vehicle-mounted device, a wearable device, and a network device or base station (gNB) in an NR network or a network device in the future evolved PLMN network, etc.

In the embodiments of the present application, the network device provides services for a cell, and the terminal device communicates with the network device through transmission resources (for example, frequency domain resources, or spectrum resources) used by the cell. The cell may be a cell corresponding to the network device (for example, a base station). The cell may belong to the macro base station, or it may belong to the base station corresponding to the Small cell. The Small cell may include a Metro cell, a Micro cell, a Pico cell, a Femto cell, etc. These Small cells have the characteristics of small coverage and low transmit power, and are suitable for providing high-speed data transmission services.

After the cell search process, the terminal device has achieved downlink synchronization with the cell, so the terminal device can receive downlink data. However, the terminal device can perform uplink transmission only when it obtains uplink synchronization with the cell. The terminal device may establish a connection with the cell through a Random Access Procedure and obtain uplink synchronization. In order to facilitate understanding of the solutions of the embodiments of the present application, the random access procedure will be briefly described below with reference to FIG. 2.

The random access procedure may usually be triggered by the following events:

(1) Initial Access

For example, when the terminal device needs to enter a Radio Resource Control (RRC) connected state (RRC_CO-NNECTED) from an RRC idle state (RRC_IDLE state), the terminal device may trigger initial access.

(2) RRC Connection Re-establishment procedure (3) Handover

At this time, the terminal device is in the connected state and needs to establish uplink synchronization with a new cell.

(4) In the RRC connected state, when downlink data or uplink data arrives, the uplink is in a "non-synchronised" state (DL or UL data arrival during RRC_CONNECTED when UL synchronisation status is "non-synchronised").

(5) In the RRC connected state, when uplink data arrives, there is no available Physical Uplink Control Channel (PUCCH) resource for Scheduling Request (SR) transmission (UL data arrival during RRC_CONNECTED when there are no PUCCH resources for SR available).

(6) SR failure.

(7) Request by RRC upon synchronous reconfiguration.

(8) The terminal device transitions from the RRC inactive state (Transition from RRC_INACTIVE).

(9) To establish time alignment at SCell addition.

(10) The terminal device requests Other System Information (OSI).

(11) The terminal device needs to perform Beam failure recovery.

Figure 2:
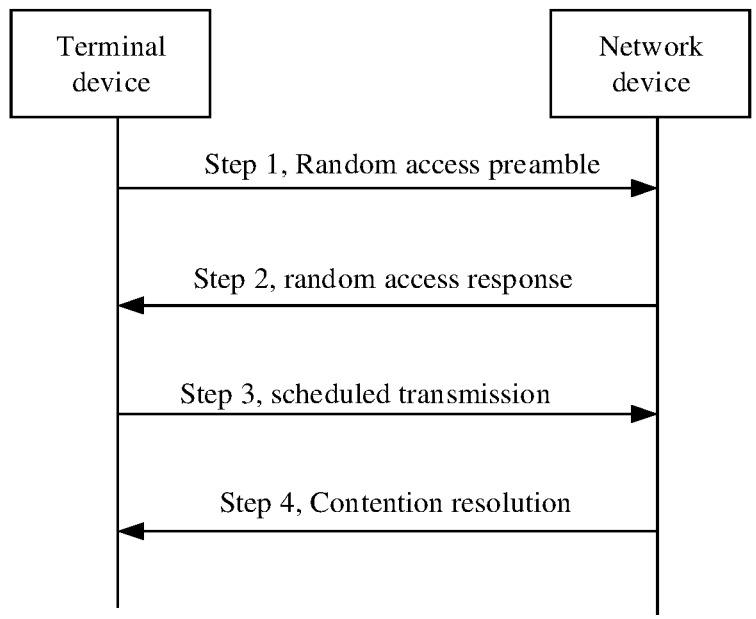
FIG. 2 is a schematic diagram of a four-step random access provided by an embodiment of the present application.

In the NR system, two random access manners may be supported: a contention-based random access manner and a non-contention-based random access manner. The contention-based four-step random access is briefly described below. As shown in FIG. 2, the four-step random access includes the following steps.

In step 1, the terminal device sends a random access preamble (Preamble, that is, Msg 1) to the network device.

The random access preamble may also be referred to as a preamble, a random access preamble sequence, a preamble sequence, or the like.

Specifically, the terminal device may select Physical Random Access Channel (PRACH) resources, and the PRACH resources may include time domain resources, frequency domain resources and code domain resources. The network device sends random access related parameters to the terminal device by broadcasting a System Information Block (SIB) 1. The Reference Signal Receiving Power (RSRP) threshold value (rsrp-ThresholdSSB) for the Synchronization Signal Block (SSB) in the random access common configuration information element (RACH-ConfigCommon IE) is used for the terminal device to select the SSB. The terminal device compares the RSRP measurement result under each SSB with the rsrp-ThresholdSSB, and selects the SSB whose measured value is higher than the configured threshold value for access. If there is no SSB that meets the configured threshold value, the terminal device randomly selects one SSB from all SSBs for access. Each SSB corresponds to a set of random access preamble (Preamble) resources and random access occasion (RACH Occasion, RO) resources, and the terminal device performs random selection on the resources for contention-based random access in the selected SSBs, and sets the Preamble index (PREAMBLE_INDEX) to be the selected random access Preamble. The network device may estimate the transmission delay between itself and the terminal device according to the Preamble, and calibrate uplink timing accordingly, and may roughly determine the resource size required by the terminal device to transmit Msg 3. In order to allow the network device to more accurately know the size of the Msg 3 to be transmitted and allocate appropriate uplink resources, the Preamble is divided into Preamble group A and Preamble group B. If Preamble group B exists in the random access resource, the terminal device may select the Preamble group according to the size of Msg 3 and the pathloss.

In step 2, the network device sends a Random Access Response (RAR, namely Msg 2) to the terminal device After the terminal device sends the Preamble to the network device, it may start a random access response window (ra-ResponseWindow), and in the ra-ResponseWindow, it detects corresponding Physical Downlink Control Channel (PDCCH) according to the Random Access Radio Network Temporary Identifier (RA-RNTI). If the terminal device detects the PDCCH scrambled by the RA-RNTI, it may obtain a Physical Downlink Shared Channel (PDSCH) scheduled by the PDCCH. The PDSCH includes the RAR corresponding to the Preamble.

The RA-RNTI is calculated according to the time-frequency position of the PRACH that sends the Preamble. Therefore, if a plurality of terminal devices send the Preamble on the same RO, the corresponding RARs are multiplexed in the same RAR Media Access Control Protocol Data Unit (MAC PDU). If the terminal successfully receives the PDCCH scrambled by the RA-RNTI corresponding to the RO resource sending the Preamble, and the RAR contains one Random Access Preamble Identifier (RAPID) carried in a MAC sub-PDU that is corresponding to the PREAMBLE_INDEX selected in Msg 1, then the RAR is successfully received, and the terminal may decode and obtain the Timing Advance Command (TAC), the uplink grant resource (UL Grant) and the Temporary Cell Radio Network Temporary Identity (TC-RNTI), to perform Msg 3.

If the RA-RNTI scrambled PDCCH corresponding to the RO resource sending the Preamble is not received during the operation of the ra-ResponseWindow, or if the RA-RNTI scrambled PDCCH is received, but the RAR does not contain the MAC subPDU corresponding to the PREAMBLE_INDEX, the occurrence of the above two cases may be deemed as that the RAR reception fails. At this time, if the number of transmissions of Preamble does not exceed the maximum number of transmissions (preambleTransMax) configured by the network, the terminal device needs to retransmit Msg 1. If the number of transmissions of Preamble exceeds the maximum number of transmissions (preambleTransMax) configured by the network, the terminal device reports the random access problem to the upper layer.

In step 3, the terminal device sends Msg 3.

After receiving the RAR message, the terminal device determines whether the RAR belongs to its own RAR message.

For example, the terminal device may use the preamble index to check, and after determining that it belongs to its own RAR message, it may generate Msg 3 at the RRC layer, and send Msg 3 to the network device, where Msg 3 needs to carry the identification information of the terminal device, etc.

Msg 3 is mainly used to notify the network device of the trigger event of the random access. For different random access trigger events, Msg 3 sent by the terminal device in step 3 may include different contents.

For example, for the initial access scenario, Msg 3 may include an RRC connection request message (RRC Setup Request) generated by the RRC layer.

In addition, Msg 3 may also carry, for example, a 5G-Serving-Temporary Mobile Subscriber Identity (S-TMSI) of the terminal device or a random number.

For another example, for the RRC connection reestablishment scenario, Msg 3 may include an RRC connection reestablishment request message (RRC Reestabilshment Request) generated by the RRC layer.

In addition, Msg 3 may also carry, for example, a Cell Radio Network Temporary Identifier (C-RNTI) and the like.

For another example, for the handover scenario, Msg 3 may include an RRC handover confirm message (RRC Handover Confirm) generated by the RRC layer, which carries the C-RNTI of the terminal device.

In addition, Msg 3 may also carry information such as a Buffer Status Report (BSR). For other trigger events such as uplink/downlink data arrival scenarios, Msg 3 may include at least the C-RNTI of the terminal device.

In step 4, the network device sends a contention resolution message (contention resolution), that is, Msg 4, to the terminal device.

The network device sends the Msg 4 to the terminal device, and the terminal device correctly receives the Msg 4 to complete the Contention Resolution. For example, during the RRC connection establishment, Msg 4 may carry the RRC connection establishment message.

Since the terminal device in step 3 may carry its own unique identifier in Msg 3, in the contention resolution mechanism, the network device may carry the unique identifier of the terminal device in Msg4 to designate the terminal device that wins in the contention. And other terminal devices that do not win in the contention resolution may re-initiate the random access.

It should be understood that, in the embodiments of the present application, competition contention resolution may have two manners.

First manner: if the terminal device carries the C-RNTI in Msg 3, then Msg 4 may be scheduled by the PDCCH scrambled by the C-RNTI.

Second manner: if the terminal device does not carry the C-RNTI in the Msg 3, such as initial access, the Msg 4 may be scheduled by the PDCCH scrambled by the TC-RNTI. At this time, the contention may be resolved by the following method: the terminal device receiving the PDSCH of Msg 4, obtaining the contention resolution ID, and matching the contention resolution ID with the Common control channel (CCCH) Service data unit (SDU) in Msg 3 to determine whether the contention is resolved.

Figure 3:
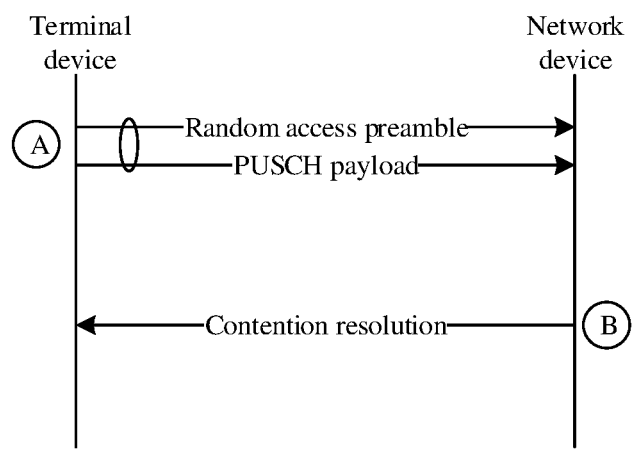
FIG. 3 is a schematic diagram of a two-step random access according to an embodiment of the present application.
Figure 4:
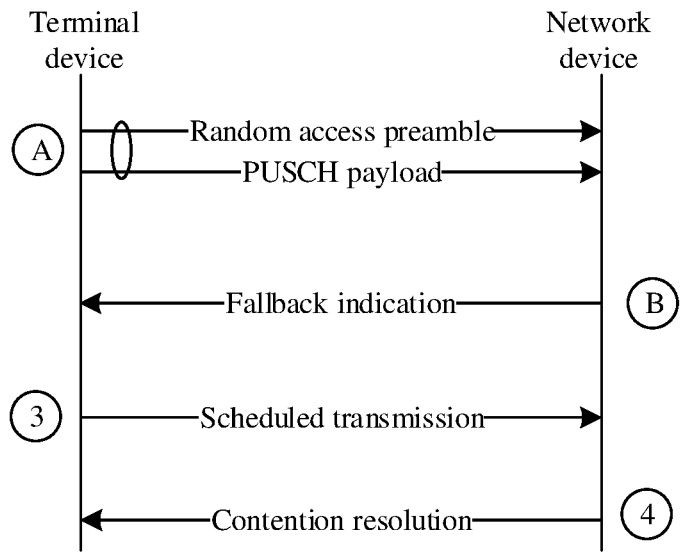
FIG. 4 is a schematic diagram in which the two-step random access falls back to the four-step random access according to an embodiment of the present application.

The delay of the four-step random access is relatively large, which is not suitable for low-latency and high-reliability scenarios in 5G. Considering the characteristics of low-latency and high-reliability related services, the two-step random access scheme is proposed. Msg A in the two-step random access includes the Preamble transmitted on the PRACH and the load information transmitted on the Physical Uplink Shared Channel (PUSCH). After Msg A is transmitted, the terminal device monitors the response of the network side in the configured window. If an indication that the contention is successfully resolved is received from the network, the terminal ends the random access procedure, as shown in FIG. 3; and if a fallback indication is received in Msg B, the terminal device executes transmission of Msg 3 and monitors the result of contention resolution, as shown in FIG. 4. If the contention resolution is unsuccessful after the transmission of Msg 3, the terminal continues the transmission of Msg A.

When two-step random access resources and four-step random access resources are both configured on the UL BWP at the same time, the UE needs to select the random access type. Assuming that the RSRP measured by the UE is higher than the threshold value configured by the network, the UE enters the two-step random access procedure. The network may configure the maximum number of transmissions "N" of Msg A for the UE. If the UE fails to access after "N" times of two-step random access attempts, the UE will fall back or switch to the four-step random access to continue with the access attempt.

However, when the two-step random access resources and the four-step random access resources are configured on the uplink BWP, how does the terminal device select the random access manner, and whether it is necessary to fall back from the two-step random access or switch to the four-step random access, are not specified.

The random access scheme designed by the present application to address the above technical problems is described in detail below.

Figure 5:
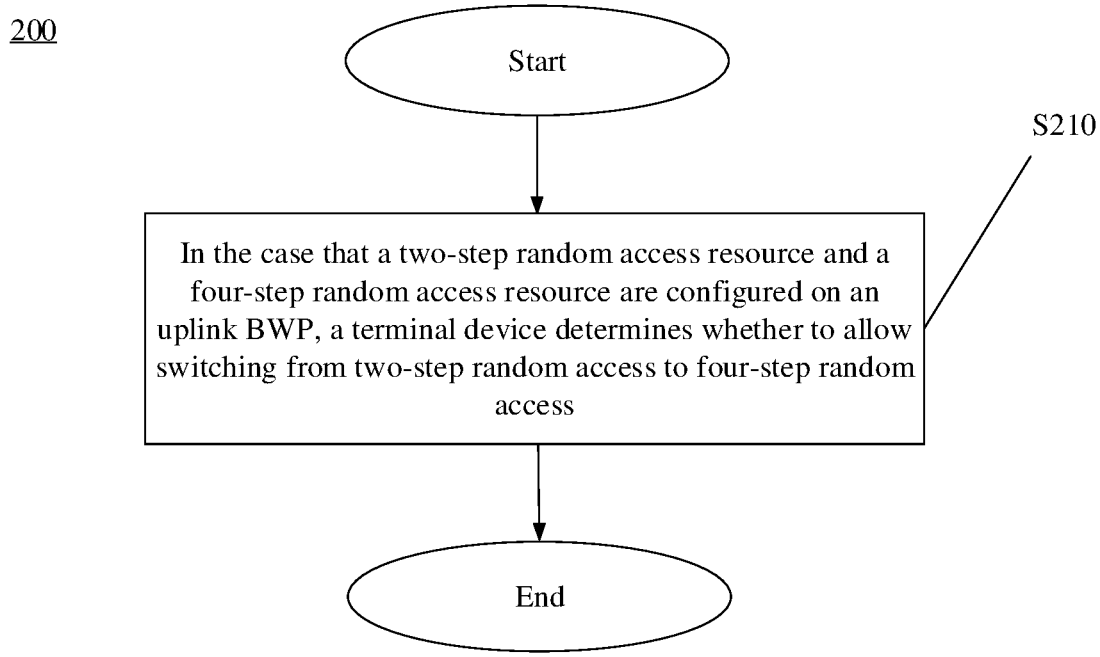
FIG. 5 is a schematic flowchart of a wireless communication method according to an embodiment of the present application.

FIG. 5 is a schematic flowchart of a wireless communication method 200 according to an embodiment of the present application. As shown in FIG. 5, the method 200 may include the following contents.

In S210, in a case that a resource of a two-step random access and a resource of a four-step random access are configured on an uplink BWP, the terminal device determines whether to allow switching from the two-step random access to the four-step random access.

In the embodiments of the present application, in the case where the two-step random access resources and the four-step random access resources are configured on the uplink BWP, in some cases, switching from the two-step random access to the four-step random access is allowed; and in other cases, switching from the two-step random access to the four-step random access is not allowed.

It should be noted that in the case where the two-step random access resource and the four-step random access resource are configured on the uplink BWP, the terminal device may be allowed to perform the two-step random access on the two-step random access resource of the uplink BWP, and perform the four-step random access on the four-step random access resource of the uplink BWP, then the terminal device can realize the two-step random access and the four-step random access.

In the embodiments of the present application, the terminal device performs the two-step random access.

Optionally, in the embodiments of the present application, the foregoing step S210 may specifically be:

the terminal device determining whether to allow switching from the two-step random access to the four-step random access according to first information;

where the first information includes at least one of the following:

handover indication information of whether to allow switching from the two-step random access to the four-step random access, whether a payload size of the first message of the two-step random access matches a size of the third message of the four-step random access corresponding to at least one random access preamble group, and a value of the maximum number of transmissions of the first message of the two-step random access.

It should be noted that the first message of the two-step random access may be the above-mentioned Msg A, and the third message of the four-step random access may be the above-mentioned Msg 3.

Optionally, the handover indication information is configured by the network device in the two-step random access parameter configuration.

For example, the switching indication information is a switching allowance indication (SwitchingAllowed). If SwitchingAllowed is configured to be false, it means that switching from the two-step random access to the four-step random access is not allowed. If SwitchingAllowed is configured to be true, it means that switching from the two-step random access to the four-step random access is allowed.

Optionally, the maximum number of transmission of the first message of the two-step random access is configured by the network device in the two-step random access parameter configuration.

Optionally, the at least one random access preamble group is configured by the network device in the four-step random access parameter configuration. Optionally, the network device may also configure the at least one random access preamble group in the two-step random access parameter configuration.

For example, the network device configures Preamble group A and Preamble group B in the two-step random access parameter configuration, and similarly, the network device may also configure Preamble group A and Preamble group B in the four-step random access parameter configuration. Specifically, the terminal device selects the Preamble from the Preamble group A during the two-step random access procedure, and after switching from the two-step random access to the four-step random access, the terminal device may also select the Preamble from the Preamble group A for the four-step random access.

In the embodiments of the present application, whether the payload size of the first message (Msg A payload size) of the two-step random access matches the size of the third message of the four-step random access corresponding to at least one random access preamble group (ra-Msg3 Size) may be further understood through the following first and second cases.

First case: the network device does not configure Group B in the four-step random access resource, that is, only configures Group A in the four-step random access resource, and if Msg A payload size<=the minimum supported Msg 3 size (56 bits), the sizes are matched.

Second case 2: the network device configures Group A and Group B and the size threshold ra-Msg3 SizeGroupA in the four-step random access resource at the same time;

if MsgA payload size<=ra-Msg3SizeGroupA, it matches the Msg3 size corresponding to Group A;

if MsgA payload size<=ra-Msg3SizeGroupB, it matches the Msg3 size corresponding to Group B;

otherwise, there is no match.

Optionally, as a first example, the terminal device may determine whether to allow switching from the two-step random access to the four-step random access based on 'the handover indication information of whether to allow switching from the two-step random access to the four-step random access, and whether the payload size of the first message of the two-step random access matches the size of the third message of the four-step random access corresponding to at least one random access preamble group" in the first information.

Specifically, in the first example, the terminal device determining whether to allow switching from the two-step random access to the four-step random access according to the first information, includes one of the following:

if the handover indication information indicates that switching from the two-step random access to the four-step random access is not allowed, the terminal device determining that switching from the two-step random access to the four-step random access is not allowed;

if the handover indication information indicates that switching from the two-step random access to the four-step random access is allowed, and the payload size of the first message of the two-step random access matches the size of the third message of the four-step random access corresponding to a part or all of the at least one random access preamble group, the terminal device determining that switching from the two-step random access to the four-step random access is allowed; and if the handover indication information indicates that switching from the two-step random access to the four-step random access is allowed, and the payload size of the first message of the two-step random access does not match the sizes of the third messages of the four-step random access corresponding to all of the at least one random access preamble group, the terminal device determining that switching from the two-step random access to the four-step random access is not allowed.

Optionally, as a second example, the terminal device may determine whether to allow switching from the two-step random access to the four-step random access based on "whether the payload size of the first message of the two-step random access matches the size of the third message of the four-step random access corresponding to at least one random access preamble group" in the first information.

Specifically, in the second example, the terminal device determining whether to allow switching from the two-step random access to the four-step random access according to the first information, includes one of the following:

if the payload size of the first message of the two-step random access matches the size of the third message of the four-step random access corresponding to some or all of the at least one random access preamble group, the terminal device determining to allow switching from the two-step random access to the four-step random access;

if the payload size of the first message of the two-step random access does not match the size of the third message of the four-step random access corresponding to all of the at least one random access preamble group, the terminal device determining that switching from the two-step random access to the four-step random access is not allowed.

Optionally, as a third example, the terminal device may determine whether to allow switching from the two-step random access to the four-step random access based on "the value of the maximum number of transmissions of the first message of the two-step random access, and whether the payload size of the first message of the two-step random access matches the size of the third message of the four-step random access corresponding to at least one random access preamble group" in the first information.

Specifically, in the third example, the terminal device determining whether to allow switching from the two-step random access to the four-step random access according to the first information, includes one of the following:

if the maximum number of transmissions of the first message of the two-step random access is an infinite value, the terminal device determining that switching from the two-step random access to the four-step random access is not allowed;

if the maximum number of transmissions of the first message of the two-step random access is a finite value, and the payload size of the first message of the two-step random access matches the size of the third message of the four-step random access corresponding to a part or all of the at least one random access preamble group, the terminal device determining that switching from the two-step random access to the four-step random access is allowed; and if the maximum number of transmissions of the first message of the two-step random access is a finite value, and the payload size of the first message of the two-step random access do not match the sizes of the third messages of the four-step random access corresponding to all of the at least one random access preamble group, the terminal device determining that switching from the two-step random access to the four-step random access is not allowed.

Optionally, for the above first example and second example, if the terminal device determines that switching from the two-step random access to the four-step random access is not allowed, the terminal device performs a random access problem reporting after N two-step random access attempts, where N is the maximum number of transmissions of the first message of the two-step random access.

Optionally, for the above third example, if the terminal device determines that switching from the two-step random access to the four-step random access is not allowed, the terminal device performs a random access problem reporting after attempting M two-step random access, where M is the maximum number of attempts to trigger problem reporting in the two-step random access.

Optionally, M is configured by the network device in the two-step random access parameter configuration.

Optionally, for the above first to third examples, if the terminal device determines that switching from the two-step random access to the four-step random access is allowed, the terminal device switches from the two-step random access to the four-step random access after N two-step random access attempts, where N is the maximum number of transmissions of the first message of the two-step random access.

Optionally, after the terminal device switches from the two-step random access to the four-step random access, the terminal device selects a random access preamble for the four-step random access from a first random access preamble group, where the first random access preamble group is one random access preamble group in the at least one random access preamble group in which the size of the corresponding third message of the four-step random access matches the payload of the first message of the two-step random access.

Therefore, in the embodiments of the present application, in the case where the two-step random access resources and the four-step random access resources are configured on the uplink BWP at the same time, the terminal device may determine whether to allow switching from the two-step random access to the four-step random access, realizing the flexibility of random access.

The above wireless communication method 200 will be described in detail below with specific embodiments.

Figure 6:
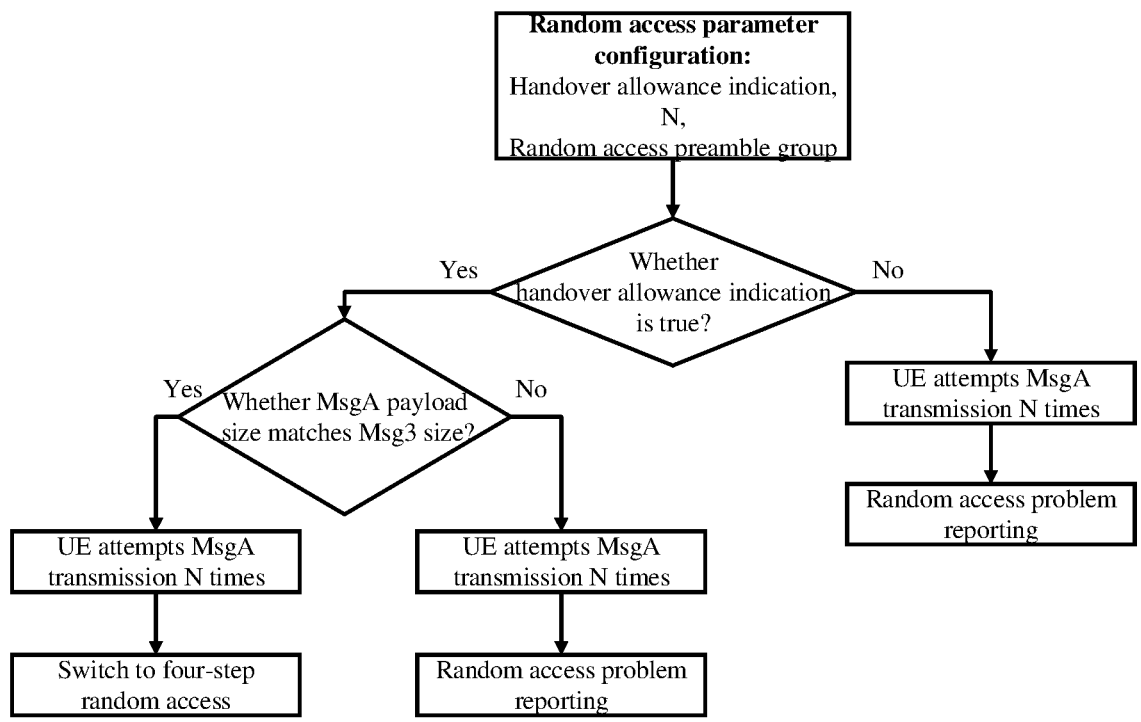
FIG. 6 is a flow chart of determination of switching from the two-step random access to the four-step random access according to an embodiment of the present application.

In a first embodiment, the network device configures SwitchingAllowed and the maximum number of transmissions N of Msg A for the terminal device in the two-step random access parameter information element (IE), and indicates the Preamble group for the four-step random access for the terminal device in the four-step random access parameter IE. It is assumed that Preamble group A and Preamble group B exist. The determining process of switching from the two-step random access to the four-step random access may be shown in FIG. 6.

1. If the switching allowance indication is false (SwitchingAllowed=false), the terminal device (UE) reports a random access problem after N times of two-step random access attempts.

2. If the switching allowance indication is true (SwitchingAllowed=true),

A. if the payload size of Msg A matches the size of Msg 3 corresponding to Preamble group A, the terminal device (UE) switches to the four-step random access after attempting N times of two-step random access, and selects the Preamble for the four-step random access from the Preamble group A;

B. if the payload size of Msg A matches the size of Msg3 corresponding to Preamble group B, the terminal device (UE) switches to the four-step random access after attempting N times of two-step random access, and selects the Preamble for the four-step random access from the Preamble group B;

C. if the payload size of Msg A does not match the size of Msg 3 corresponding to Preamble group A and Preamble group B, the terminal device (UE) cannot switch to the four-step random access after attempting N times of two-step random access, and reports the random access problem.

In the first embodiment, a parameter is introduced into the two-step random access configuration to indicate whether switching is allowed, for example, it is named SwitchingAllowed. If SwitchingAllowed is configured to be false, it means that switching is not allowed, and if SwitchingAllowed is configured to be true, switching is allowed. In the case of allowing switching, the terminal device further determines whether switching can occur according to the relationship between the payload size of Msg A and the size of Msg 3 corresponding to the Preamble group.

Figure 7:
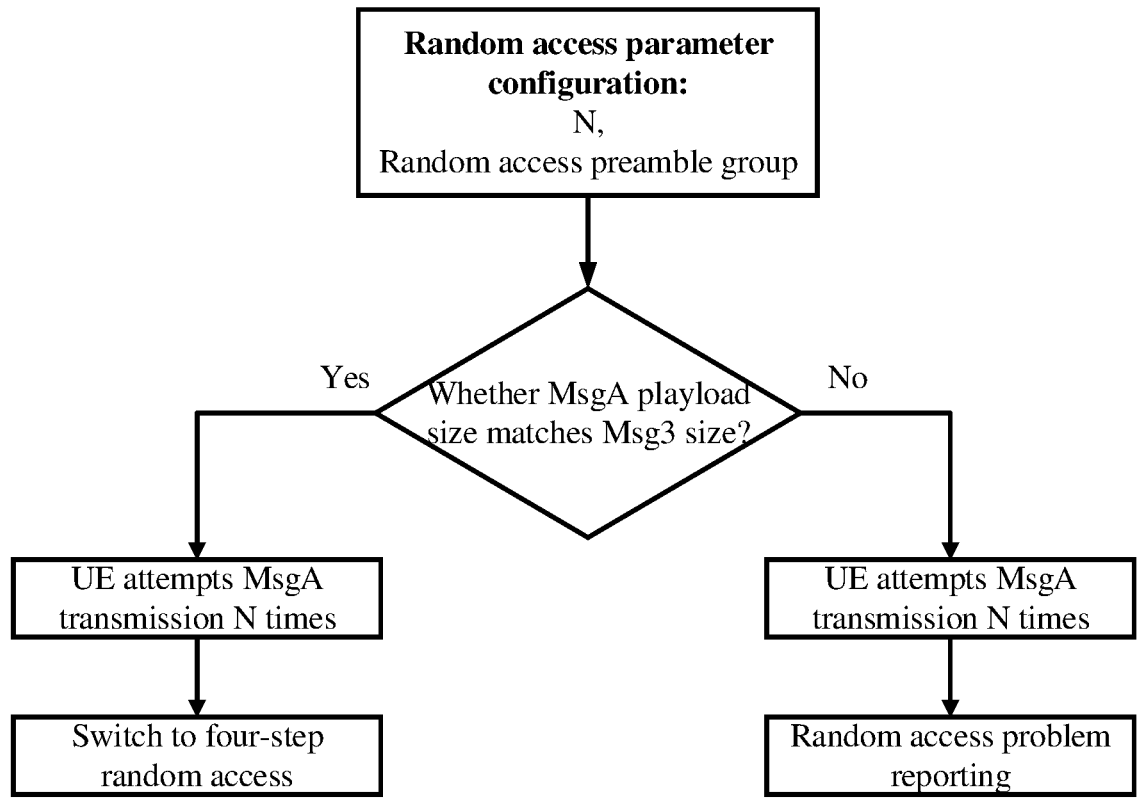
FIG. 7 is another flow chart of determination of switching from the two-step random access to the four-step random access according to an embodiment of the present application.

In a second embodiment, the network device configures the maximum number of transmissions N of Msg A for the terminal device in the two-step random access parameter IE, and indicates to the terminal device a Preamble group for four-step random access in the four-step random access parameter IE. It is assumed that Preamble group A and Preamble group B exist. The determining process of switching from the two-step random access to the four-step random access may be as shown in FIG. 7.

1. If the payload size of Msg A does not match the sizes of Msg 3 corresponding to Preamble group A and Preamble group B, the terminal device reports the random access problem after attempting N two-step random access.

2. If the payload size of Msg A matches the size of Msg 3 corresponding to Preamble group A or Preamble group B, the terminal device switches to the four-step random access after attempting the two-step random access for N times, and selects the Preamble for the four-step random access from the Preamble group A or the Preamble group B.

In a second embodiment, the terminal device implicitly infers whether the switching is allowed and can occur through whether the Msg A payload size matches the Msg 3 size corresponding to the Preamble group. Compared with the first embodiment, in the second embodiment, the network device is not required to explicitly indicate whether the switching can occur, which saves signaling overhead, but at the same time limits the flexibility of the network device in configuring the uplink resources used to transmit the MsgA payload, so as to achieve the purpose of implicitly indicating whether RACH type switching is possible.

Figure 8:
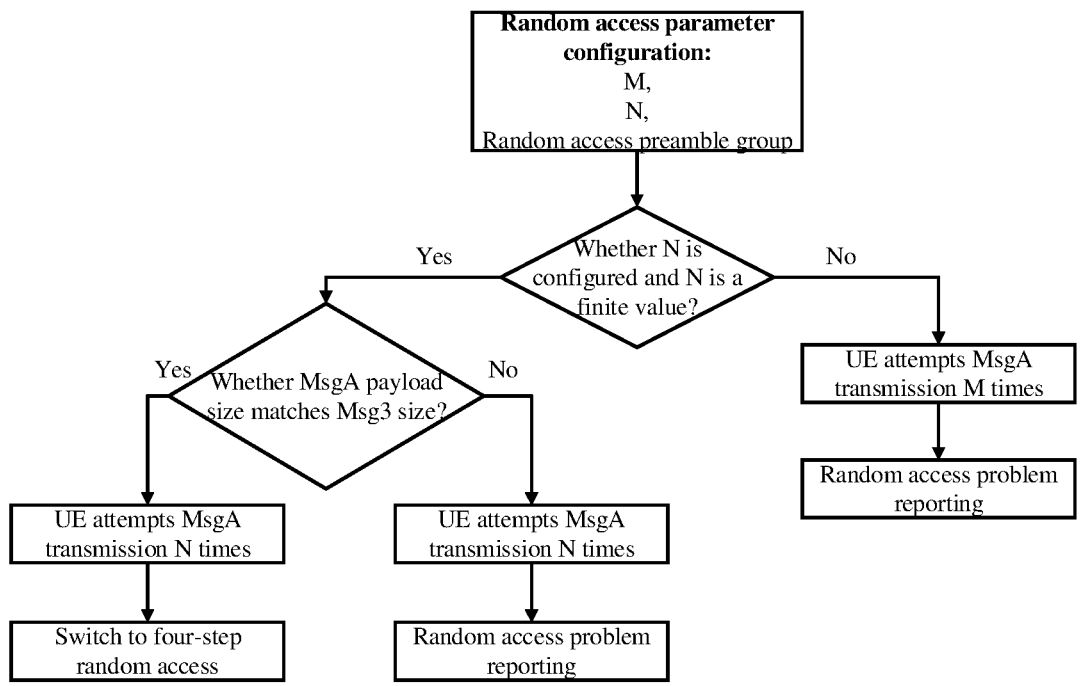
FIG. 8 is a still another flow chart of determination of switching from the two-step random access to the four-step random access according to an embodiment of the present application.

In a third embodiment, the network device configures the maximum number of attempts M of problem reporting and the maximum number of transmissions N of Msg A for the terminal device in the two-step random access parameter IE, and indicates to the terminal device in the four-step random access parameter IE the Preamble group for the four-step random access. It is assumed that Preamble group A and Preamble group B exist. The determining process of switching from the two-step random access to the four-step random access may be as shown in FIG. 8.

1. If the maximum number of transmissions N of Msg A is not configured, or the maximum number of transmissions N of Msg A is configured as an infinite value or a limitless value, the terminal device reports the random access problem after attempting M times of the two-step random access.

2. If the maximum number of transmissions N of Msg A is configured and N is a finite value, A. if the Msg A payload size matches the Msg 3 size corresponding to Preamble group A, the terminal device switches to the four-step random access after attempting N times of the two-step random access, and selects the Preamble for the four-step random access from the Preamble group A;

B. if the Msg A payload size matches the Msg 3 size corresponding to Preamble group B, the terminal device switches to the four-step random access after attempting the two-step random access for N times, and selects the Preamble for the four-step random access from the Preamble group B;

C. if the Msg A payload size does not match the Msg 3 size corresponding to Preamble group A and Preamble group B, the terminal device cannot switch to the four-step random access after N times of two-step random access attempts, until the random access problem is reported after the number of transmissions of Msg A reaches M times.

In the third embodiment, the terminal device determines whether to allow the handover according to whether the maximum number of transmissions N of Msg A is configured and whether N is a finite value. At the same time, the parameter M is introduced into the two-step random access configuration to indicate the maximum number of attempts to report the two-step random access problem. In the case of allowing handover, the terminal device further determines whether handover can occur through the relationship between the Msg A payload size and the Msg 3 size corresponding to the Preamble group.

The wireless communication method according to the embodiments of the present application has been described in detail above from the perspective of the terminal device in combination with FIG. 5 to FIG. 8. The wireless communication method according to another embodiment of the present application is described in detail below with reference to FIG. 9 from the perspective of the network device. It should be understood that the description on the side of the terminal device corresponds to the description on the side of the network device, and similar descriptions may be referred to the above contents, which are not repeated here to avoid repetition.

Figure 9:
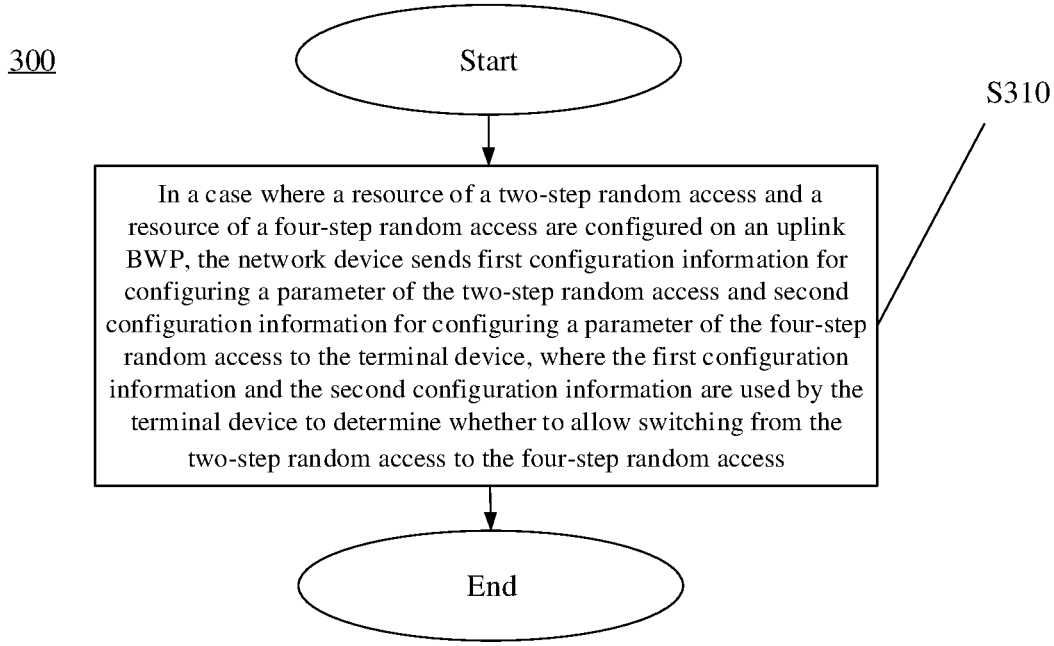
FIG. 9 is a schematic flowchart of another wireless communication method according to an embodiment of the present application.

FIG. 9 is a schematic flowchart of a wireless communication method 300 according to an embodiment of the present application. As shown in FIG. 9, the method 300 may include the following contents.

In S310, in a case where a resource of a two-step random access and a resource of a four-step random access are configured on an uplink BWP, the network device sends first configuration information for configuring a parameter of the two-step random access and second configuration information for configuring a parameter of the four-step random access to the terminal device, where the first configuration information and the second configuration information are used by the terminal device to determine whether to allow switching from the two-step random access to the four-step random access.

Optionally, the first configuration information includes at least one of the following:

handover indication information of whether allow to switching from the two-step random access to the four-step random access, a maximum number of transmissions of the first message for the two-step random access, at least one random access preamble group for the two-step random access.

Optionally, the first configuration information includes at least one of the following:

a maximum number of attempts to trigger problem reporting in the two-step random access, a maximum number of transmissions of the first message for the two-step random access, and at least one random access preamble group for the two-step random access.

Optionally, the second configuration information includes at least one random access preamble group used for the four-step random access.

Therefore, in the embodiment of the present application, when the two-step random access resource and the four-step random access resource are configured on the uplink BWP at the same time, the terminal device can determine whether it is allowed to switch from the two-step random access to the four-step random access based on the first configuration information for configuring the two-step random access parameter and the second configuration information for configuring the four-step random access parameter sent by the network device, thereby realizing the flexibility of random access.

The method embodiments of the present application are described in detail above with reference to FIGS. 5 to 9, and the apparatus embodiments of the present application are described in detail below with reference to FIGS. 10 to 14. It should be understood that the apparatus embodiments and the method embodiments correspond to each other, and the similar description may refer to the method embodiments.

Figure 10:
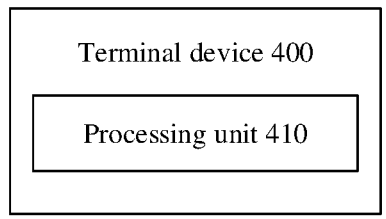
FIG. 10 is a schematic block diagram of a terminal device according to an embodiment of the present application.

FIG. 10 shows a schematic block diagram of a terminal device 400 according to an embodiment of the present application. As shown in FIG. 10, the terminal device 400 includes:

a processing unit 410, where, in a case where a resource of a two-step random access and a resource of a four-step random access are configured on an uplink BWP, the processing unit 410 is configured to determine whether to allow switching from the two-step random access to the four-step random access.

Optionally, the processing unit 410 is specifically configured to:

determine whether switching from the two-step random access to the four-step random access is allowed according to first information;

wherein the first information includes at least one of the following:

handover indication information of whether to allow switching from the two-step random access to the four-step random access, whether a payload size of a first message of the two-step random access matches a size of a third message of the four-step random access corresponding to at least one random access preamble group, and a value of a maximum number of transmissions of the first message of the two-step random access.

Optionally, the processing unit 410 determining whether to allow switching from the two-step random access to the four-step random access according to the first information, includes one of the following:

if the handover indication information indicates that switching from the two-step random access to the four-step random access is not allowed, the processing unit 410 determining that switching from the two-step random access to the four-step random access is not allowed;

if the handover indication information indicates that switching from the two-step random access to the four-step random access is allowed, and the payload size of the first message of the two-step random access matches the size of the third message of the four-step random access corresponding to a part or all of the at least one random access preamble group, the processing unit 410 determining that switching from the two-step random access to the four-step random access is allowed;

if the handover indication information indicates that switching from the two-step random access to the four-step random access is allowed, and the payload size of the first message of the two-step random access does not match the sizes of the third messages of the four-step random access corresponding to all of the at least one random access preamble group, the processing unit 410 determining that switching from the two-step random access to the four-step random access is not allowed.

Optionally, the processing unit 410 determining whether to allow switching from the two-step random access to the four-step random access according to the first information, includes one of the following:

if the payload size of the first message of the two-step random access matches the size of the third message of the four-step random access corresponding to a part or all of the random access preamble groups in the at least one random access preamble group, the processing unit 410 determining to allow switching from the two-step random access to the four-step random access;

if the payload size of the first message of the two-step random access does not match the size of the third message of the four-step random access corresponding to all the random access preamble groups in the at least one random access preamble group, the processing unit 410 determining that switching from the two-step random access to the four-step random access is not allowed.

Optionally, the processing unit 410 determining whether to allow switching from the two-step random access to the four-step random access according to the first information, includes one of the following:

if the maximum number of transmissions of the first message of the two-step random access is an infinite value, the processing unit 410 determining that switching from the two-step random access to the four-step random access is not allowed;

if the maximum number of transmissions of the first message of the two-step random access is a finite value, and the payload size of the first message of the two-step random access matches the sizes of the third messages of the four-step random access corresponding to a part or all the random access preamble groups in the at least one random access preamble group, the processing unit 410 determining that switching from the two-step random access to the four-step random access is allowed;

if the maximum number of transmissions of the first message of the two-step random access is a finite value, and the payload size of the first message of the two-step random access does not match the sizes of the third messages of the four-step random access corresponding to all random access preamble group in the at least one random access preamble group, the processing unit 410 determining that switching from the two-step random access to the four-step random access is not allowed.

Optionally, the terminal device further includes: a communication unit, if the terminal device determines that switching from the two-step random access to the four-step random access is not allowed, after the terminal device has attempted the two-step random access N times, the communication unit is configured to report a random access problem, where N is the maximum number of transmissions of the first message of the two-step random access.

Optionally, the terminal device further includes: a communication unit, if the terminal device determines that switching from the two-step random access to the four-step random access is not allowed, after the terminal device has attempted the two-step random access M times, the communication unit is configured to report a random access problem, where M is the maximum number of attempts to trigger problem reporting in two-step random access.

Optionally, M is configured by the network device in the two-step random access parameter configuration.

Optionally, if the terminal device determines that switching from the two-step random access to the four-step random access is allowed, after the terminal device has attempted the two-step random access N times, the processing unit 410 is further configured to switch from the two-step random access to the four-step random access, where N is the maximum number of transmissions of the first message of the two-step random access.

Optionally, the processing unit 410 is further configured to select a random access preamble for the four-step random access from a first random access preamble group, where the first random access preamble group is one random access preamble group in the at least one random access preamble group in which the size of the corresponding third message of the four-step random access matches the payload size of the first message of the two-step random access.

Optionally, the handover indication information and/or the maximum number of transmissions of the first message of the two-step random access are configured by the network device in the two-step random access parameter configuration.

Optionally, the at least one random access preamble group is configured by the network device in the four-step random access parameter configuration.

Optionally, in some embodiments, the above-mentioned communication unit may be a communication interface or a transceiver, or an input/output interface of a communication chip or a system-on-chip. The aforementioned processing unit may be one or more processors.

It should be understood that the terminal device 400 according to the embodiments of the present application may correspond to the terminal device in the method embodiments of the present application, and the above-mentioned and other operations and/or functions of each unit in the terminal device 400 are respectively for realizing the corresponding process of the terminal device in the method 200 shown in FIG. 5, which is not repeated here for brevity.

Figure 11:
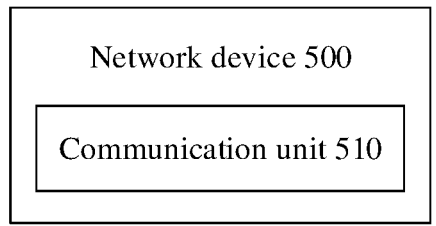
FIG. 11 is a schematic block diagram of a network device according to an embodiment of the present application.

FIG. 11 shows a schematic block diagram of a network device 500 according to an embodiment of the present application. As shown in FIG. 11, the network device 500 includes:

a communication unit 510, where, in a case that a resource of a two-step random access and a resource of a four-step random access are configured on an uplink BWP, the communication unit 510 is configured to send first configuration information for configuring a parameter of the two-step random access and second configuration information for configuring a parameter of the four-step random access to the terminal device, where the first configuration information and the second configuration information are used by the terminal device to determine whether to allow switching from the two-step random access to the four-step random access.

Optionally, the first configuration information includes at least one of the following:

handover indication information of whether to allow switching from the two-step random access to the four-step random access, a maximum number of transmissions of the first message for the two-step random access, and at least one random access preamble group for the two-step random access.

Optionally, the first configuration information includes at least one of the following:

a maximum number of attempts to trigger problem reporting in the two-step random access, a maximum number of transmissions of the first message for the two-step random access, and at least one random access preamble group for the two-step random access.

Optionally, the second configuration information at least includes at least one random access preamble group used for the four-step random access.

Optionally, in some embodiments, the above-mentioned communication unit may be a communication interface or a transceiver, or an input/output interface of a communication chip or a system-on-chip.

It should be understood that the network device 500 according to the embodiments of the present application may correspond to the network device in the method embodiments of the present application, and the above-mentioned and other operations and/or functions of each unit in the network device 500 are respectively for realizing the corresponding process of the network device in the method 300 shown in FIG. 9, which is not repeated here for brevity.

Figure 12:
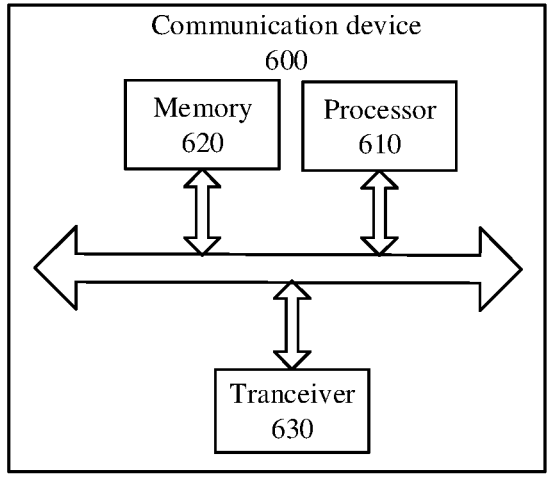
FIG. 12 is a schematic block diagram of a communication device according to an embodiment of the present application.

FIG. 12 is a schematic structural diagram of a communication device 600 provided by an embodiment of the present application. The communication device 600 shown in FIG. 12 includes a processor 610, and the processor 610 may call and run a computer program from a memory, so as to implement the method in the embodiments of the present application.

Optionally, as shown in FIG. 12, the communication device 600 may further include a memory 620. The processor 610 may call and run a computer program from the memory 620 to implement the methods in the embodiments of the present application.

The memory 620 may be a separate device independent of the processor 610, or may be integrated in the processor 610.

Optionally, as shown in FIG. 12, the communication device 600 may further include a transceiver 630, and the processor 610 may control the transceiver 630 to communicate with other devices, specifically, may send information or data to other devices, or receive information or data sent by other devices.

Among them, the transceiver 630 may include a transmitter and a receiver. The transceiver 630 may further include an antenna, and the number of the antennas may be one or more.

Optionally, the communication device 600 may specifically be the network device in the embodiments of the present application, and the communication device 600 may implement the corresponding processes implemented by the network device in each method in the embodiments of the present application. For the sake of brevity, details are not repeated here.

Optionally, the communication device 600 may specifically be the mobile terminal/terminal device of the embodiments of the present application, and the communication device 600 may implement the corresponding processes implemented by the mobile terminal/terminal device in each method of the embodiments of the present application. For the sake of brevity, details are not repeated here.

Figure 13:
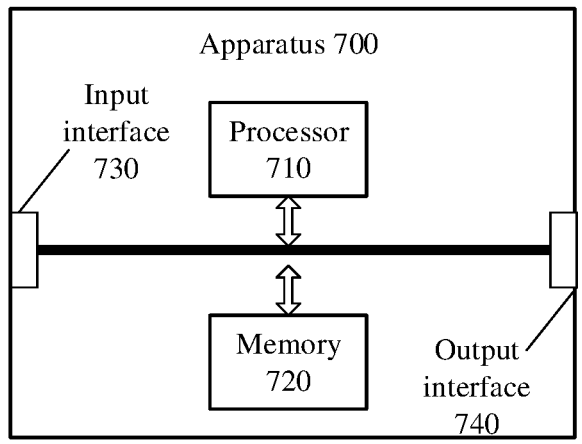
FIG. 13 is a schematic block diagram of an apparatus according to an embodiment of the present application.

FIG. 13 is a schematic structural diagram of an apparatus according to an embodiment of the present application. The apparatus 700 shown in FIG. 13 includes a processor 710, and the processor 710 may call and run a computer program from a memory, so as to implement the method in the embodiments of the present application.

Optionally, as shown in FIG. 13, the apparatus 700 may further include a memory 720. The processor 710 may call and run a computer program from the memory 720 to implement the methods in the embodiments of the present application.

The memory 720 may be a separate device independent of the processor 710, or may be integrated in the processor 710.

Optionally, the apparatus 700 may further include an input interface 730. The processor 710 may control the input interface 730 to communicate with other devices or chips, and specifically, may obtain information or data sent by other devices or chips.

Optionally, the apparatus 700 may further include an output interface 740. The processor 710 may control the output interface 740 to communicate with other devices or chips, and specifically, may output information or data to other devices or chips.

Optionally, the apparatus may be applied to the network device in the embodiments of the present application, and the apparatus may implement the corresponding processes implemented by the network device in the various methods of the embodiments of the present application, which are not repeated here for brevity.

Optionally, the apparatus may be applied to the mobile terminal/terminal device in the embodiments of the present application, and the apparatus may implement the corresponding processes implemented by the mobile terminal/terminal device in each method of the embodiments of the present application, which are not repeated here for brevity.

Optionally, the device mentioned in the embodiments of the present application may also be a chip. For example, it may be a system-level chip, a system chip, a chip system, or a system-on-chip.

Figure 14:
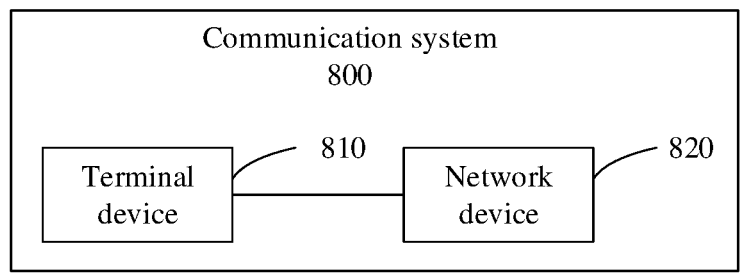
FIG. 14 is a schematic block diagram of a communication system according to an embodiment of the present application.

FIG. 14 is a schematic block diagram of a communication system 800 provided by an embodiment of the present application. As shown in FIG. 14, the communication system 800 includes a terminal device 810 and a network device 820.

The terminal device 810 may be used to implement the corresponding functions implemented by the terminal device in the above methods, and the network device 820 may be used to implement the corresponding functions implemented by the network device in the above methods. For brevity, details are not repeated here.

It should be understood that the processor in the embodiments of the present application may be an integrated circuit chip, which has a signal processing capability. In the implementation process, each step of the above method embodiments may be completed by a hardware integrated logic circuit or an instruction in the form of software in the processor. The above-mentioned processor may be a general-purpose processor, a Digital Signal Processor (DSP), an Application Specific Integrated Circuit (ASIC), a Field Programmable Gate Array (FPGA) or other available programming logic devices, discrete gate or transistor logic devices, discrete hardware components. The methods, steps, and logic block diagrams disclosed in the embodiments of the present application can be implemented or executed. The general purpose processor may be a microprocessor or the processor may be any conventional processor or the like. The steps of the method disclosed in conjunction with the embodiments of the present application may be directly embodied as executed by a hardware decoding processor, or executed by a combination of hardware and software modules in the decoding processor. The software modules may be located in a random access memory, a flash memory, a read-only memory, a programmable read-only memory or an electrically erasable programmable memory, a register and other storage media mature in the art. The storage medium is located in the memory, and the processor reads information in the memory, and completes the steps of the above methods in combination with its hardware.

It can be understood that the memory in the embodiments of the present application may be a volatile memory or a non-volatile memory, or may include both the volatile memory and the non-volatile memory. The non-volatile memory may be a Read-Only Memory (ROM), a Programmable Read-Only Memory (PROM), an Erasable Programmable Read-Only Memory (EPROM), an Electrically EPROM (EEPROM) or a flash memory. The volatile memory may be a Random Access Memory (RAM), which acts as an external cache. By way of example and not limitation, many forms of RAM are available, such as a Static RAM (SRAM), a Dynamic RAM (DRAM), a Synchronous DRAM, SDRAM), a Double Data Rate SDRAM (DDR SDRAM), an Enhanced SDRAM (ESDRAM), a Synchlink DRAM (SLDRAM) and a Direct Rambus RAM (DR RAM). It should be noted that the memory of the systems and methods described herein is intended to include, but not be limited to, these and any other suitable types of memory.

It should be understood that the above-mentioned memory is an example but not a limitative description. For example, the memory in the embodiments of the present application may also be a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a Direct Rambus RAM (DR RAM) and so on. That is, the memory in the embodiments of the present application is intended to include but not limited to these and any other suitable types of memory.

Embodiments of the present application further provide a computer-readable storage medium for storing a computer program.

Optionally, the computer-readable storage medium may be applied to the network device in the embodiments of the present application, and the computer program enables the computer to execute the corresponding processes implemented by the network device in the various methods of the embodiments of the present application, which are not elaborated here for brevity.

Optionally, the computer-readable storage medium may be applied to the mobile terminal/terminal device in the embodiments of the present application, and the computer program enables the computer to execute the corresponding processes implemented by the mobile terminal/terminal device in the various methods of the embodiments of the present application, which are not elaborated here for brevity.

Embodiments of the present application also provide a computer program product, including computer program instructions.

Optionally, the computer program product may be applied to the network device in the embodiments of the present application, and the computer program instructions cause the computer to execute the corresponding processes implemented by the network device in each method of the embodiments of the present application, which are not elaborated here for brevity.

Optionally, the computer program product may be applied to the mobile terminal/terminal device in the embodiments of the present application, and the computer program instructions cause the computer to execute the corresponding processes implemented by the mobile terminal/terminal device in each method of the embodiments of the present application, which are not elaborated here for brevity.

The embodiments of the present application also provide a computer program.

Optionally, the computer program may be applied to the network device in the embodiments of the present application. When the computer program runs on a computer, the computer executes the corresponding processes implemented by the network device in each method of the embodiments of the present application, which are not elaborated here for brevity.

Optionally, the computer program may be applied to the mobile terminal/terminal device in the embodiments of the present application, and when the computer program is run on a computer, the computer executes the corresponding processes implemented by the mobile terminal/terminal device in various methods of the embodiments of the present application, which are not elaborated here for brevity.

A person of ordinary skill in the art may be aware that the units and algorithm steps of the examples described in combination with the embodiments disclosed herein may be implemented by electronic hardware or a combination of computer software and the electronic hardware. Whether these functions are executed by hardware or software depends on the specific application and design constraint conditions of the technical solution. Professionals and technicians may use different methods for each specific application to implement the described functions, but such implementation should not be considered beyond the scope of the present application.

Those skilled in the art can clearly understand that, for the convenience and conciseness of description, the specific working process of the above-described system, apparatus, and unit may refer to the corresponding process in the foregoing method embodiments, which are not elaborated here.

In the several embodiments provided in the present application, it should be understood that the disclosed system, apparatus, and method may be implemented in other ways.

For example, the apparatus embodiments described above are only illustrative.

For example, the division of the units is only a logical function division, and there may be other divisions in actual implementation.

For example, a plurality of units or components may be combined or may be integrated into another system, or some features may be ignored or not implemented.

In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated, and the components displayed as units may or may not be physical units, that is, they may be located in one place, or they may be distributed on a plurality of network units. Some or all of the units may be selected according to actual needs to achieve the objectives of the solutions of the embodiments.

In addition, the functional units in the various embodiments of the present application may be integrated into one processing unit, or each unit may exist alone physically, or two or more units may be integrated into one unit.

If the function is implemented in the form of a software functional unit and sold or used as an independent product, it may be stored in a computer readable storage medium. Based on this understanding, the essence of the technical solution or the part that contributes to the related art or the part of the technical solution in the present application may be embodied in the form of a software product, and the computer software product is stored in a storage medium, which includes several instructions for enabling a computer device (which may be a personal computer, a server, or a network device, etc.) to execute all or part of the steps of the methods described in the various embodiments of the present application. The aforementioned storage media include: a U disk, a mobile hard disk, a Read-Only Memory (ROM), a Random Access Memory (RAM), a magnetic disk, an optical disk, or other media that can store program codes.

The above contents are only specific implementations of the present application, and the protection scope of the present application is not limited thereto. Any person skilled in the art can easily think of changes or substitutions within the technical scope disclosed in the present application, which should be covered within the scope of protection of the present application. Therefore, the protection scope of the present application should be subject to the protection scope of the claims.

What is claimed is:

1. A wireless communication method, comprising:
  in a case where a resource of a two-step random access and a resource of a four-step random access are configured on an uplink bandwidth part (BWP), determining, by a terminal device, whether to allow switching from the two-step random access to the four-step random access,
  wherein the determining, by the terminal device, whether to allow switching from the two-step random access to the four-step random access, comprises:
  determining, by the terminal device, whether to allow switching from the two-step random access to the four-step random access according to first information;
  wherein the first information comprises:
  switch indication information of whether to allow switching from the two-step random access to the four-step random access,
  wherein the method further comprises:
  when the terminal device determines that switching from the two-step random access to the four-step random access is not allowed, reporting, by the terminal device, a random access problem after attempting the two-step random access M times, wherein M is a maximum number of attempts to trigger problem reporting in the two-step random access, and wherein M is configured by a network device in a parameter configuration of the two-step random access.

2. The method according to claim 1, wherein the determining, by the terminal device, whether to allow switching from the two-step random access to the four-step random access according to the first information, comprises:
when the switch indication information indicates that switching from the two-step random access to the four-step random access is not allowed, determining, by the terminal device, that switching from the two-step random access to the four-step random access is not allowed.

3. The method according to claim 1, wherein the first information comprises whether a payload size of a first message of the two-step random access matches a size of a third message of the four-step random access corresponding to at least one random access preamble group, and the determining, by the terminal device, whether to allow switching from the two-step random access to the four-step random access according to the first information, comprises one of the following:
when the payload size of the first message of the two-step random access matches the size of the third message of the four-step random access corresponding to a part or all of the at least one random access preamble group, determining, by the terminal device, that switching from the two-step random access to the four-step random access is allowed; and
when the payload size of the first message of the two-step random access does not match the size of the third message of the four-step random access corresponding to all of the at least one random access preamble group, determining, by the terminal device, that switching from the two-step random access to the four-step random access is not allowed.

4. The method according to claim 1, wherein the first information comprises a value of a maximum number of transmissions N of the first message of the two-step random access and/or whether a payload size of a first message of the two-step random access matches a size of a third message of the four-step random access corresponding to at least one random access preamble group, and the determining, by the terminal device, whether to allow switching from the two-step random access to the four-step random access according to the first information, comprises one of the following:
when the value of the maximum number of transmissions N of the first message of the two-step random access is an infinite value, determining, by the terminal device, that switching from the two-step random access to the four-step random access is not allowed;
when the value of the maximum number of transmissions N of the first message of the two-step random access is a finite value, and the payload size of the first message of the two-step random access matches the size of the third message of the four-step random access corresponding to a part or all of the at least one random access preamble group, determining, by the terminal device, that switching from the two-step random access to the four-step random access is allowed; and
when the value of the maximum number of transmissions N of the first message of the two-step random access is a finite value, and the payload size of the first message of the two-step random access does not match the size of the third message of the four-step random access corresponding to all of the at least one random access preamble group, determining, by the terminal device, that switching from the two-step random access to the four-step random access is not allowed.

5. The method according to claim 1, further comprising:
when the terminal device determines that switching from the two-step random access to the four-step random access is allowed, switching, by the terminal device, from the two-step random access to the four-step random access after attempting the two-step random access N times, wherein N is a maximum number of transmissions of the first message of the two-step random access.

6. The method according to claim 5, wherein the switch indication information and/or the maximum number of transmissions N of the first message of the two-step random access are configured by the network device in the parameter configuration of the two-step random access.

7. The method according to claim 1, wherein the first information further comprises whether a payload size of a first message of the two-step random access matches a size of a third message of the four-step random access corresponding to at least one random access preamble group, and wherein the determining, by the terminal device, whether to allow switching from the two-step random access to the four-step random access according to the first information further comprises:
when the switch indication information indicates that switching from the two-step random access to the four-step random access is allowed, and the payload size of the first message of the two-step random access matches the size of the third message of the four-step random access corresponding to a part or all of the at least one random access preamble group, determining, by the terminal device, that switching from the two-step random access to the four-step random access is allowed; and
when the switch indication information indicates that switching from the two-step random access to the four-step random access is allowed, and the payload size of the first message of the two-step random access does not match the size of the third messages of the four-step random access corresponding to all of the at least one random access preamble group, determining, by the terminal device, that switching from the two-step random access to the four-step random access is not allowed.

8. The method according to claim 7, wherein the at least one random access preamble group is configured by the network device in a parameter configuration of the four-step random access.

9. A terminal device, comprising:
a processor; and
a memory,
wherein the memory is used for storing a computer program, and the processor is used for calling and running the computer program stored in the memory to cause the terminal device to perform the method of:
in a case that a resource of a two-step random access and a resource of a four-step random access are configured on an uplink bandwidth part (BWP), determining whether to allow switching from the two-step random access to the four-step random access,
wherein the processor is further configured to cause the terminal device to perform:
determining whether to allow switching from the two-step random access to the four-step random access according to first information;

wherein the first information comprises:
switch indication information of whether to allow switching from the two-step random access to the four-step random access,
when determining that switching from the two-step random access to the four-step random access is not allowed, reporting a random access problem after the terminal device has attempted the two-step random access M times, wherein M is a maximum number of attempts to trigger problem reporting in the two-step random access, and wherein M is configured by a network device in a parameter configuration of the two-step random access.

10. The terminal device according to claim 9, wherein the processor is further configured to cause the terminal device to perform:
when the switch indication information indicates that switching from the two-step random access to the four-step random access is not allowed, determining that switching from the two-step random access to the four-step random access is not allowed.

11. The terminal device according to claim 9, wherein the first information comprises whether a payload size of a first message of the two-step random access matches a size of a third message of the four-step random access corresponding to at least one random access preamble group, and the processor is further configured to cause the terminal device to perform one of the following:
when the payload size of the first message of the two-step random access matches the size of the third message of the four-step random access corresponding to a part or all of the at least one random access preamble group, determining that switching from the two-step random access to the four-step random access is allowed; and
when the payload size of the first message of the two-step random access does not match the size of the third message of the four-step random access corresponding to all of the at least one random access preamble group, determining that switching from the two-step random access to the four-step random access is not allowed.

12. The terminal device according to claim 9, wherein the first information comprises a value of a maximum number of transmissions N of the first message of the two-step random access and/or whether a payload size of a first message of the two-step random access matches a size of a third message of the four-step random access corresponding to at least one random access preamble group, and the processor is further configured to cause the terminal device to perform one of the following:
when the value of the maximum number of transmissions of the first message of the two-step random access is an infinite value, determining that switching from the two-step random access to the four-step random access is not allowed;
when the value of the maximum number of transmissions of the first message of the two-step random access is a finite value, and the payload size of the first message of the two-step random access matches the size of the third message of the four-step random access corresponding to a part or all of the at least one random access preamble group, determining that switching from the two-step random access to the four-step random access is allowed; and
when the value of the maximum number of transmissions of the first message of the two-step random access is a finite value, and the payload size of the first message of the two-step random access does not match the size of the third message of the four-step random access corresponding to all of the at least one random access preamble group, determining that switching from the two-step random access to the four-step random access is not allowed.

13. The terminal device according to claim 9, wherein when the terminal device determines that switching from the two-step random access to the four-step random access is allowed, the processor is further configured to cause the terminal device to perform switching from the two-step random access to the four-step random access after the terminal device has attempted the two-step random access N times, wherein N is a maximum number of transmissions of the first message of the two-step random access.

14. The terminal device according to claim 13, wherein the switch indication information and/or the maximum number of transmissions N of the first message of the two-step random access are configured by the network device in the parameter configuration of the two-step random access.

15. The terminal device according to claim 9, wherein the first information further comprises whether a payload size of a first message of the two-step random access matches a size of a third message of the four-step random access corresponding to at least one random access preamble group, and wherein the processor is further configured to cause the terminal device to perform:
when the switch indication information indicates that switching from the two-step random access to the four-step random access is allowed, and the payload size of the first message of the two-step random access matches the size of the third message of the four-step random access corresponding to a part or all of the at least one random access preamble group, determining that switching from the two-step random access to the four-step random access is allowed; and
when the switch indication information indicates that switching from the two-step random access to the four-step random access is allowed, and the payload size of the first message of the two-step random access does not match the size of the third messages of the four-step random access corresponding to all of the at least one random access preamble group, determining that switching from the two-step random access to the four-step random access is not allowed.

16. The terminal device according to claim 15, wherein the at least one random access preamble group is configured by the network device in a parameter configuration of the four-step random access.

17. A network device, comprising:
a processor; and
a memory,
wherein the memory is used for storing a computer program, and the processor is used for calling and running the computer program stored in the memory to cause the network device to perform the method of:
in a case where a resource of a two-step random access and a resource of a four-step random access are configured on an uplink bandwidth part (BWP), sending first configuration information for configuring a parameter of the two-step random access and second configuration information for configuring a parameter of the four-step random access to a terminal device, wherein the first configuration information and the second configuration information are used by the terminal device to determine whether to allow switching from the two-step random access to the four-step random access, wherein the first configuration information comprises:
switch indication information of whether to allow switching from the two-step random access to the four-step random access, wherein the first configuration information further comprises a maximum number of attempts to trigger problem reporting in the two-step random access M, and when the terminal device determines that switching from the two-step random access to the four-step random access is not allowed, the terminal device reports a random access problem after attempting the two-step random access M times.

18. The network device according to claim 17, wherein when the terminal device determines that switching from the two-step random access to the four-step random access is allowed, the terminal device switches from the two-step random access to the four-step random access after attempting the two-step random access N times, wherein N is a maximum number of transmissions of the first message of the two-step random access.

19. The network device according to claim 17, wherein when the switch indication information indicates that switching from the two-step random access to the four-step random access is not allowed, the terminal device determines that switching from the two-step random access to the four-step random access is not allowed.

20. The network device according to claim 17, wherein when the switch indication information indicates that switching from the two-step random access to the four-step random access is allowed, the terminal device determines whether a payload size of a first message of the two-step random access matches a size of a third message of the four-step random access corresponding to at least one random access preamble group, and when the payload size of the first message of the two-step random access matches the size of the third message of the four-step random access corresponding to a part or all of the at least one random access preamble group, the terminal device determines that switching from the two-step random access to the four-step random access is allowed, when the payload size of the first message of the two-step random access does not match the size of the third messages of the four-step random access corresponding to all of the at least one random access preamble group, the terminal device determines that switching from the two-step random access to the four-step random access is not allowed.

* * * * *